Sept. 11, 1956

A. C. BODY ET AL 2,762,894

APPARATUS FOR HIGH-FREQUENCY INDUCTION
HEATING OF SMALL-DIAMETER WIRE

Filed March 17, 1951

INVENTOR.
ALFRED C. BODY
BY JAMES W. WILLIAMSON

Alfred C Body
ATTORNEY

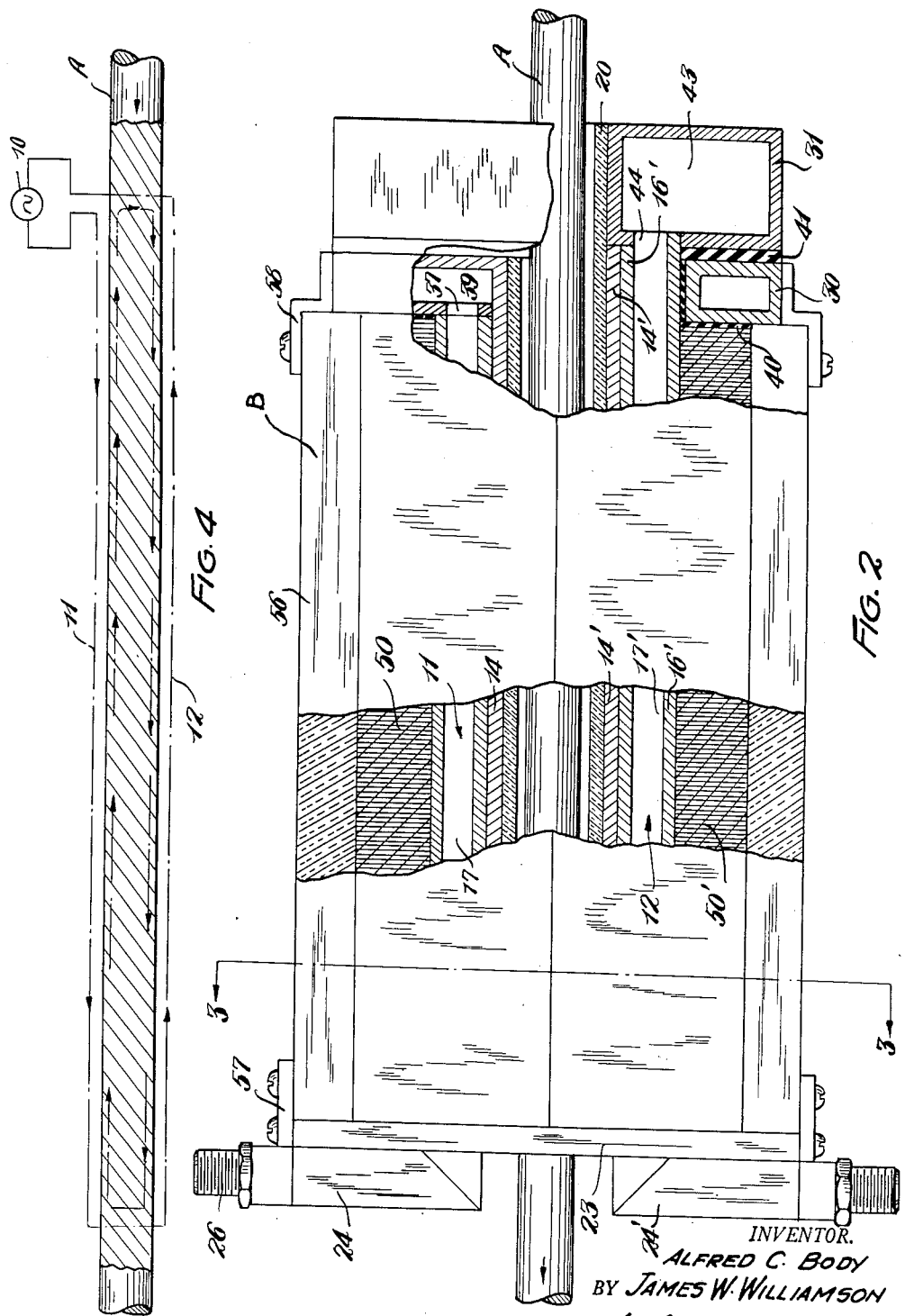

United States Patent Office 2,762,894
Patented Sept. 11, 1956

2,762,894

APPARATUS FOR HIGH-FREQUENCY INDUCTION HEATING OF SMALL-DIAMETER WIRE

Alfred C. Body and James W. Williamson, Cleveland, Ohio, assignors to The Ohio Crankshaft Company, Cleveland, Ohio, a corporation of Ohio Application March 17, 1951, Serial No. 216,184

1 Claim. (Cl. 219—10.61)

This invention pertains to the art of high-frequency induction heating and, more particularly, to a method and apparatus for heating small-diameter wire.

In the art of heating wire or other small-diameter metallic articles by high-frequency induction heating, it has been conventional in the past to provide a helical coil or inductor energized from a source of high-frequency electrical energy. The wire to be heated is continuously moved through the coil along its axis. High-frequency currents are induced to flow circumferentially in the surfaces of the wire and these currents, being of high amperage, rapidly heat the wire to an elevated temperature.

The principal problem in the heating of small-diameter wire by high-frequency induced heating has been the efficiency of power transfer from the inductor to the wire. It is known that, for any frequency of the power source, there is an optimum diameter of wire for the most efficient transfer of power to the wire. For wire sizes below this optimum diameter, the efficiency of energy transfer drops off very rapidly.

This may be explained in part by the fact that the induced high-frequency currents flow principally adjacent the surface of the wire. The higher the frequency, the less the penetration below the surface and vice versa. For any given frequency, it is known that as the wire size decreases, the penetration of the current flow tends to approach the radius of the wire and as this happens, the maximum current which can be induced to flow in the wire rapidly decreases, together with the efficiency of power transfer to the wire.

Another factor in the efficiency of energy transfer to the wire is the ratio of the length of the current path of the wire to the length of current path in the helical coil inductor. There must always be electrical and heat insulation between the wire and the inductor. There is a minimum practicable thickness of such insulation so that as the wire size goes down, the thickness of the insulation becomes a bigger and bigger percentage of the wire diameter. Accordingly, as the wire diameter goes down, the ratio of the length of the current path in the wire and the inducing coil also must go down. This ratio also limits the over-all efficiency of power transfer obtainable even though the frequency of the power source is so high that the depth of current penetration does not approach the radius of the wire.

There are two principal sources of high-frequency electrical energy in practical use today. One of these employs electronic vacuum tubes in a high-frequency oscillator circuit. Such power sources are basically inefficient. They are expensive to manufacture and have a high maintenance cost. The range of frequency of power which may be generated, however, is practically unlimited. Heretofore, for small-diameter wires, such power sources had to be employed.

The other principal source of high-frequency electrical energy is a high-speed, rotating, motor alternator which, on a kilowatt-for-kilowatt basis, is much cheaper to manufacture than the electronic power source and has a minimum of maintenance problems. The maximum practicable frequency output of such generators, however, is in the neighborhood of 10,000 cycles per second.

The present invention contemplates and has for its principal object a high-frequency inductor for inducing heating currents in a continuously moving length of wire which is simple and rugged in construction, inexpensive to manufacture and which is capable of efficiently transferring electrical power to the wire.

The invention also contemplates and has for a principal object the provision of a method of flowing current in a continuously moving wire which will considerably extend the minimum diameter of wire which can be efficiently heated with a power source of a given frequency.

In accordance with the present invention, a high-frequency inductor is provided which comprises a pair of parallel electrical conductors having close-spaced opposed surfaces between which the wire to be heated is adapted to be continuously moved in a direction parallel to the length of the conductors. The conductors are electrically connected together at one end and the opposite ends are connected to a source of high-frequency electrical energy. High-frequency electric currents circulate through the two parallel conductors and create a flux field thereabout which threads through the wire and induces currents to flow axially in diametrically opposite sides of said wire and in opposite directions. The conductors are preferably wider than the wire diameter and the opposed faces thereof are preferably recessed or concaved over their entire length and the wire moves in this recess. With this construction, the conductors may approach each other a distance closer than the diameter of the wire itself. The flux is, therefore, forced to flow between the portions of the conductors which are closer together than the diameter of the wire and must, therefore, thread directly through the wire itself.

Also, preferably, the two conductors have magnetically-permeable material over their entire length and around their outer surfaces other than the opposed facing recessed surfaces. Such magnetically-permeable material may be elongated stacks of magnetic laminations having their principal plane transverse to the length of the conductors.

With such an inductor, the currents and, thus, the heating will primarily be concentrated lengthwise on diametrically opposite sides of the wire. Uneven heating may result if time is not allowed for the heat to be conducted to the other sides of the wire. The invention contemplates, in such instance, a pair of inductors offset 90 degrees relative to each other or the conductors may encircle the wire for a quarter of a turn over their length.

A specific object of the invention is the provision of a new and improved high-frequency inductor which comprises a pair of parallel close-spaced conductors between which the wire to be heated may continuously move, the two conductors being adapted to be connected in electrical series with a high-frequency power source and induce currents to flow axially of the wire and on opposite sides thereof.

Another object of the invention is the provision of a new and improved high-frequency inductor of the type referred to wherein the conductors are wider than the wire and their opposed surfaces are concave over the entire length to define a work-receiving passage through which continuous lengths of wire to be heated are moved.

Another object of the invention is the provision of a new and improved high-frequency inductor comprising a pair of parallel close-spaced conductors each having opposed surfaces between which a wire to be heated may be moved and each having about the other surfaces a magnetically-permeable material extending over generally the entire length thereof.

Still another object of the invention is the provision of a new and improved high-frequency inductor for heating continuous lengths of small-diameter wire, which inductor comprises a pair of parallel conductors having relatively close-spaced parallel opposed surfaces and magnetically-permeable material about the other surfaces and extending at least beyond the opposed surfaces, the conductors being connected in electrical-series relationship.

Still another object of the invention is the provision of a new and improved method of flowing currents in a length of small-diameter wire for the purpose of heating same which comprises simultaneously inducing high-frequency currents to flow longitudinally on diametrically opposite sides of said wire in opposite directions and continuing the current flow until the wire reaches a desired elevated temperature.

The invention will be specifically set forth and defined in the claim at the end hereof. It may take physical form in a number of different-appearing forms and embodiments, a preferred one of which will be described in detail in this specification and illustrated in the accompanying drawing which is a part hereof, and wherein:

Figure 2 is a side elevational view with portions broken away to show interior constructional details of the inductor of Figure 1;

Figure 4 is a schematic diagram of the inductor in current-inducing relationship with a wire, the arrows indicating the direction of current flow.

Figure 1:
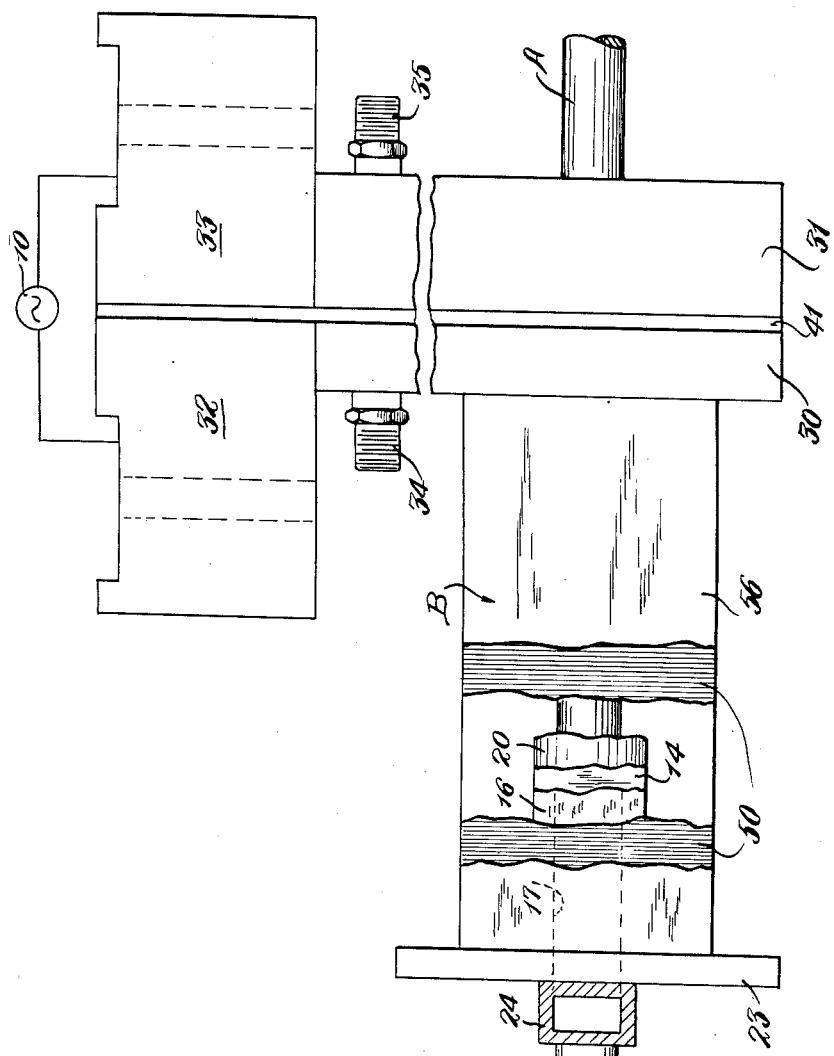
Figure 1 is a top elevational view with portions broken away to show interior constructional details of a high-frequency inductor embodying the present invention.

Referring now to the drawings, Figures 1 and 2 show a continuous length of small-diameter wire A passing from right to left through a high-frequency inductor B constructed in accordance with the principles of the invention. This inductor is shown connected to a source of high-frequency alternating-current electric energy 10 which may have a frequency of any desired value but, preferably, 10,000 cycles per second.

The wire A may be of any known metallic material such as, but not limited to, steel, copper, brass, aluminum or otherwise. It may be either of a long continuous length or of relatively short lengths which are advanced from right to left through the coil and the speed of movement will depend upon a number of factors; such as, the efficiency of power transfer of the inductor B, the power input to the inductor, the desired temperature increase of the wire and the material from which it is formed.

The wire A may have any desired diameter including that which has heretofore been considered impractical to heat with 10,000 cycle per second electric power.

The inductor B is generally elongated in the direction of movement of the wire A. In general, it comprises a pair of electrical conductors indicated generally by the numerals 11, 12 which extend over generally the entire length of the inductor B on opposite sides of and in close-spaced relationship to the wire A. The conductors 11, 12 may take a number of different forms or shapes; but, in the preferred embodiment shown, they comprise generally a relatively flat conductor member 14 elongated in the length of the wire A. One of the flat surfaces of the conductor member 14; that is, the wire or workpiece-facing surface, is generally concave as at 15. The opposite surface from the surface 15 has a length of rectangular copper tubing 16 brazed thereto. This tubing has an interior passage 17 through which cooling water may be circulated. As will be seen, the conductors 11, 12 are identical in construction and like numerals with a prime mark added have been used to indicate like parts.

The conductors 11, 12 are held in fixed spaced relationship by a cylindrical hollow tube 20 of a refractory-type material which has both heat and electrical resistance. This tube 20 extends the entire length of the inductor B and the wire A passes through the interior of the tube 20 and is thereby insulated electrically from the conductors 11, 12 and the tube 20 protects the conductors 11, 12 from the heat of the wire A. The radius of the surface 15 is the same as the outer radius of the tube 20.

The left end of the conductors 11, 12 and the refractory tube 20 extend through a suitably-shaped opening of an end plate 23 which is formed of an electrically-conducting material such as copper. The conductors 11, 12 are brazed or otherwise electrically connected to the plate 23 and this plate thus serves to connect the left ends of the conductors 11, 12 electrically together. As shown, the end of the tube 16 extends beyond the plate 23 and is beveled at a generally 45 degree angle. A rectangular copper tube 24 having a complementary beveled end extends at right angles therefrom beyond the edges of the plate 23. A hydraulic fitting 26 for communicating the interior of the tubes 24 and 16 is suitably fixed or brazed to the outer end of the tube 24.

The right-hand ends of the conductors 11, 12 are connected respectively to a pair of conductors 30, 31, usually called fish-tail leads, which extend transversely to the length of the conductors 11, 12 in close-spaced insulated relationship. As shown, these fish-tail leads 30, 31 terminate in large terminal blocks 32, 33 suitably shaped and formed to match corresponding terminal blocks on a transformer or the like connected to the power source 10. Each of the fish-tail leads 30, 31 is of hollow construction and suitable plumbing connections 34, 35 are provided by which cooling water can be circulated thereinto.

In the embodiment shown, the conductor 12 is electrically connected with the right-hand fish-tail lead 31 and the conductor 11 is connected with the left-hand fish-tail lead 30. The copper tube 16 of the conductor 11 abuts against the left side of the fish-tail lead 30 and this side has an opening 37 aligned with the opening of the tube 16 communicating the passage 17 with a cooling passage 39 in the fish-tail leads 30. In a like manner, the conductor member 14 abuts against the left-hand side of the fish-tail lead 30 and is brazed thereto.

The fish-tail lead 30 extends transversely on all sides of the conductor 11 and has a central transverse opening suitably shaped to pass the refractory tube 20 and the conductor 12 in electrically insulated relationship. As shown, a layer of electrical insulation 40 separates and insulates the fish-tail lead 30 from the conductor 11 while a layer of electrical insulation 41 insulates the two fish-tail leads 30, 31 from each other.

The fish-tail lead 31 has an opening aligned with the opening of the fish-tail lead 30 through which the refractory tube 20 also passes. The fish-tail lead 31 is also a hollow construction having an interior cavity 43 through which cooling water may be circulated. The right end of the conductor 12 is electrically connected to the lead 31. In the embodiment shown, the conductor member 14' abuts against and is suitably brazed or otherwise fixed to the left face of the lead 31. The rectangular tube 16' of the conductor 12 also abuts against the left face of the lead 31 and this left face has an opening 44 communicating with the opening 17' of the tube 16' whereby cooling water may be circulated from the cavity 43 to the passage 17 in the conductor 12.

Figure 3:
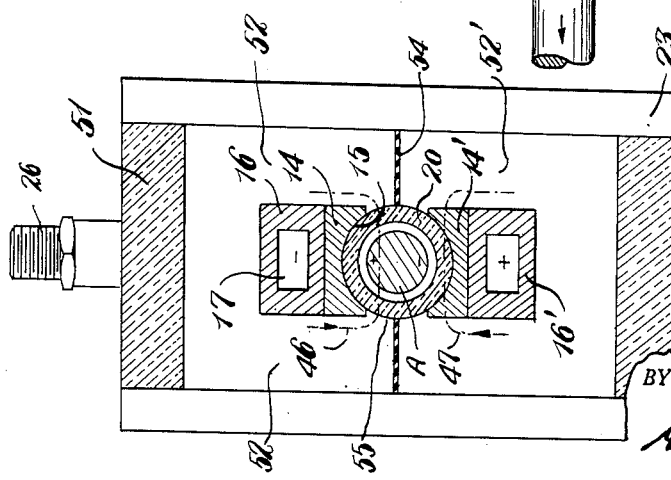
Figure 3 is a cross-sectional view of Figure 2 taken approximately on the line 3—3 thereof.

It will be seen from an examination of Figure 3 that the widths of the conductors 11, 12 are greater than the diameter of the wire A and, because of the curved workpiece-facing surfaces 15, the edges of the conductors 11, 12 may and do approach each other a distance less than the diameter of the wire A. The flux about each conductor 11, 12 must pass through the space between the conductors and through the tube 20 and its interior. The effect of the construction just described is to cause the flux to thread through the wire A. With the construction shown, the flux takes the shortest path between the edges of the conductors 11, 12 and must thread through the wire A as shown by the dotted line 46. It will be noted that if the facing surfaces 15 of the conductors 11, 12 were flat, some of the high-frequency flux could entirely avoid threading through the wire A and this flux would be of no value in generating heating currents in the wire. The flux path which would occur if the faces of the conductors 11, 12 were not recessed as shown is indicated by the dot-dash line 47 also of Figure 3. The instantaneous direction of the currents in the conductors and the corresponding induced currents in the wire A are as shown by the plus and minus signs of Figure 3 and the arrows of Figure 4.

The invention further contemplates the provision of magnetically-permeable material which generally completely surrounds the conductors 11, 12 for the entire length thereof. This material preferably surrounds the sides of the conductors 11, 12 other than the wire-facing side 15 and is generally continuous from one conductor to the other. Obviously, this material must either be a nonconductor or must have electrical insulation at some point between the two conductors.

In the embodiment shown, the magnetically-permeable material comprises two identical stacks 50, 50′ of thin U-shaped magnetic laminations of silicon steel or the like. Each lamination comprises a base 51 and a pair of parallel side legs 52 forming a channel or slot through which the conductors 11, 12 extend. As shown, the legs 52, 52′ of each stack extend beyond the opposed edges of the conductors 11, 12 into substantial abutting relationship. A thin layer of insulation 54 such as mica or the like is positioned between the abutting end of these legs. It will also be noted that the ends of each leg 52 have a short transverse-extending portion 55 so that the end thereof will engage the outer side of the tube 20.

The stacks of laminations are held in assembled relationship with each other and with their respective conductors 11, 12 by a cover member 56 of electrically-insulating material which extends along the back side of the laminations 50 between the fish-tail lead 30 and the plate 23. Brackets 57 on the plate 23 and brackets 58 on the fish-tail lead 30 serve to hold this plate and, thus, the lamination in assembled position.

The conductors 11, 12 may be constructed in manners other than that shown in the drawing. For example, each conductor can be made from a single length of a hollow conductor with the one face shaped as shown at 15 in Figure 3. If desired, ordinary round copper tubing could be brazed to the back of the conductor member 14.

Other forms of magnetically-permeable material could be employed such as powdered iron or the like. The refractory tube 20 may be of other materials, but it is preferred that it have a magnetic permeability of unity. Its characteristics are preferably such that it have high electrical resistivity, high heat resistivity, high resistance against thermal shock and a high abrasion resistance. The walls of the tube 20 should preferably be as thin as practically possible in order to provide a minimum spacing between the conductors 11, 12 and the wire A.

As stated, it is preferred that the outer edges of the two conductors approach each other at a distance less than the diameter of the wire A. However, as the high frequency flux must circulate between these two conductors, it is further preferred that the outer edges of the conductors do not approach closer than one-half the diameter of the wire A. If the edges are brought closer together than one-half the diameter of the wire, the flux density through the space between the conductors will reach a saturation point with the result that the over-all efficiency of the inductor will go down.

With the inductor shown, the currents induced to flow in the wire will be longitudinally of the wire on diametrically opposite sides thereof. These currents will actually heat the diametrically opposite sides and conduction of heat in the wire itself must be depended upon to heat the portions of the wire which are symetrically positioned relative to the two conductors 11, 12, which portions would be that part of the wire on a plane bisecting the space between the conductors and through the axis of the wire. In some cases where absolutely uniform heating of the wire must take place and the conduction in the wire itself is not sufficient to insure this condition, the invention contemplates providing two inductors in juxtadisposed relationship along the length of the wire, the inductors being offset angularly about the axis of the wire relative to each other by an angle of 90 degrees. In this way, all of the surfaces of the wires will have high-frequency currents induced to flow therein and uniform heating will be insured. As an alternative arrangement, each conductor could form a one-quarter turn helix about the length of the wire so that all portions of the wire would, at some time in the movement pass the inductor, have high-frequency currents induced to flow therein. Also, the wire could be made to rotate relative to the inductor as it passed through.

Thus it will be seen that a high-frequency inductor has been described in detail which accomplishes all the objects of the invention enumerated above and others and enables highly efficient heating of small-diameter wire with a high-frequency power of a lower frequency than has heretofore been considered desirable.

Obviously, modifications and alterations will occur to others upon a reading and understanding of this specification which will differ radically in appearance from the preferred embodiment described. It is our intention to include all such modifications insofar as they come within the scope of the appended claim.

Having thus described our invention, we claim:

In apparatus for inductively heating lengths of continuously-moving metallic small-diameter wire comprising a pair of high-frequency inductors positioned in juxtadisposed relationship along the axis of said wire, each inductor comprising a pair of elongated conductors connected in electrical series relationship with a high-frequency power source and having opposed surfaces defining a wire-receiving space therebetween, the conductors of one inductor being displaced about the axis of said wire relative to the other inductor by an angle of at least 90 degrees.

References Cited in the file of this patent

UNITED STATES PATENTS

| | | |
|---|---|---|
| 1,980,875 | Northrup | Nov. 13, 1934 |
| 1,981,629 | Northrup | Nov. 20, 1934 |
| 2,003,855 | Fredrickson | June 4, 1935 |
| 2,385,031 | Schneider et al. | Sept. 18, 1945 |
| 2,493,950 | Dow et al. | Jan. 10, 1950 |
| 2,583,227 | Neidigh | Jan. 22, 1952 |
| 2,596,770 | Groven | May 13, 1952 |
| 2,675,461 | Leonard | Apr. 13, 1954 |

FOREIGN PATENTS

| | | |
|---|---|---|
| 616,063 | Great Britain | Jan. 14, 1949 |